(12) United States Patent
Li et al.

(10) Patent No.: US 9,020,280 B2
(45) Date of Patent: Apr. 28, 2015

(54) SYSTEM AND METHOD FOR EVALUATING FOCUS DIRECTION UNDER VARIOUS LIGHTING CONDITIONS

(75) Inventors: Pingshan Li, Sunnyvale, CA (US);
Kensuke Miyagi, Sunnyvale, CA (US);
Florian Ciurea, San Jose, CA (US);
Tomonori Shuda, Tokyo (JP)

(73) Assignee: Sony Corporation, Tokyo (JP)

( * ) Notice: Subject to any disclaimer, the term of this patent is extended or adjusted under 35 U.S.C. 154(b) by 226 days.

(21) Appl. No.: 13/429,386

(22) Filed: Mar. 25, 2012

(65) Prior Publication Data

US 2013/0142386 A1 Jun. 6, 2013

Related U.S. Application Data

(60) Provisional application No. 61/565,813, filed on Dec. 1, 2011.

(51) Int. Cl.
*G06K 9/00* (2006.01)
*H04N 5/232* (2006.01)
*G06T 7/00* (2006.01)

(52) U.S. Cl.
CPC .......... *H04N 5/23212* (2013.01); *G06T 7/0069* (2013.01)

(58) Field of Classification Search
None
See application file for complete search history.

(56) References Cited

U.S. PATENT DOCUMENTS

| | | | |
|---|---|---|---|
| 7,929,801 B2* | 4/2011 | Nakamura et al. | 382/285 |
| 8,027,582 B2* | 9/2011 | Li | 396/104 |
| 2005/0127271 A1 | 6/2005 | Ortyn et al. | |
| 2005/0220358 A1* | 10/2005 | Blonde et al. | 382/264 |
| 2007/0189750 A1* | 8/2007 | Wong et al. | 396/121 |
| 2007/0297784 A1* | 12/2007 | Wong et al. | 396/89 |
| 2009/0115886 A1* | 5/2009 | Chen | 348/349 |
| 2009/0268985 A1* | 10/2009 | Wong et al. | 382/299 |
| 2011/0103679 A1* | 5/2011 | Campbell | 382/152 |

* cited by examiner

*Primary Examiner* — Hadi Akhavannik
(74) *Attorney, Agent, or Firm* — Gregory J. Koerner; Redwood Patent Law

(57) ABSTRACT

A system and method for generating a direction confidence measure includes a camera sensor device that captures blur images of a photographic target. A depth estimator calculates matching errors for the blur images. The depth estimator then generates the direction confidence measure by utilizing the matching errors and a dynamic optimization constant that is selected depending upon image characteristics of the blur images.

20 Claims, 16 Drawing Sheets

| Threshold | 0.0 | 0.003924 | 0.009821 | 0.01768 |
|---|---|---|---|---|
| Precision | 93% | 95% | 97% | 99% |
| Recall | 100% | 95% | 85% | 73% |

| Threshold | 0.0 | 0.008064 | 0.01333 | 0.02255 |
|---|---|---|---|---|
| Precision | 89% | 95% | 97% | 99% |
| Recall | 100% | 77% | 67% | 52% |

1222(a)

| Threshold | 0 | 2819 | 4936 | 10100 |
|---|---|---|---|---|
| Precision | 89% | 95% | 97% | 99% |
| Recall | 100% | 79% | 73% | 61% |

SYSTEM AND METHOD FOR EVALUATING FOCUS DIRECTION UNDER VARIOUS LIGHTING CONDITIONS

CROSS-REFERENCE TO RELATED APPLICATIONS

This application is related to, and claims priority in, U.S. Provisional Patent Application No. 61/565,813, entitled "Focus Direction Detection Confidence Measure Under Various Lighting Conditions," filed on Dec. 1, 2011. The foregoing related application is commonly assigned, and is hereby incorporated by reference.

BACKGROUND SECTION

1. Field of the Invention

This invention relates generally to techniques for analyzing image data, and relates more particularly to a system and method for evaluating focus direction under various lighting conditions.

2. Description of the Background Art

Implementing efficient methods for analyzing image data is a significant consideration for designers and manufacturers of contemporary electronic devices. However, efficiently analyzing image data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes digital image data may benefit from an effective implementation because of the large amount and complexity of the digital data involved.

Due to growing demands on system resources and substantially increasing data magnitudes, it is apparent that developing new techniques for analyzing image data is a matter of concern for related electronic technologies. Therefore, for all the foregoing reasons, developing effective systems for analyzing image data remains a significant consideration for designers, manufacturers, and users of contemporary electronic devices.

SUMMARY

In accordance with the present invention, a system and method for evaluating focus direction under various lighting conditions is disclosed. In one embodiment, a camera initially captures a defocused image1. The focus setting of the camera is then changed, and the camera captures a defocused image2 that is focused a certain distance (e.g., one depth-of-field) away from the previously captured image1. A depth estimator or other appropriate entity computes matching errors "e" between image1 and image2 in both a right direction (from the more-focused image to the less-focused image) and a wrong direction (from the less-focused image to more-focused image).

The depth estimator then computes a direction confidence measure "E" for image1 and image2 by utilizing the foregoing matching errors "e," as well as a dynamic optimization constant "d," to thereby generate the confidence measure. In certain embodiments, the depth estimator may compute the direction confidence measure according to the following formula.

$$E = \frac{e_1 - e_2}{d(e_1 + e_2) + 1}$$

where E is the direction confidence measure, $e_1$ is a matching error in a first direction, $e_2$ is a matching error in a second direction, and d is the dynamic optimization constant. In accordance with the present invention, the dynamic optimization constant may advantageously be selected depending upon various factors such as image characteristics and lighting conditions.

Next, the depth estimator determines whether an absolute value of the direction confidence measure E is greater or equal to a predetermined confidence threshold T. If the absolute value of the direction confidence measure E is greater or equal to the predetermined confidence threshold T, then a right direction is indicated, and the depth estimator may utilize the identified right direction for accurately performing depth estimation procedures. The present invention therefore provides an improved system and method for evaluating focus direction under various lighting conditions.

BRIEF DESCRIPTION OF THE DRAWINGS

FIGS. 11A-11B are drawings illustrating one embodiment for generating a detection direction confidence measure, in accordance with the present invention; and FIGS. 12A-12B are drawings illustrating one embodiment for generating a detection direction confidence measure, in accordance with the present invention.

DETAILED DESCRIPTION

The present invention relates to an improvement in image data analysis techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for generating a direction confidence measure, and includes a camera sensor device that captures blur images of a photographic target. A depth estimator calculates matching errors for the blur images. The depth estimator then generates the direction confidence measure by utilizing the matching errors and a dynamic optimization constant that is selected depending upon image characteristics of the blur images.

Figure 1:
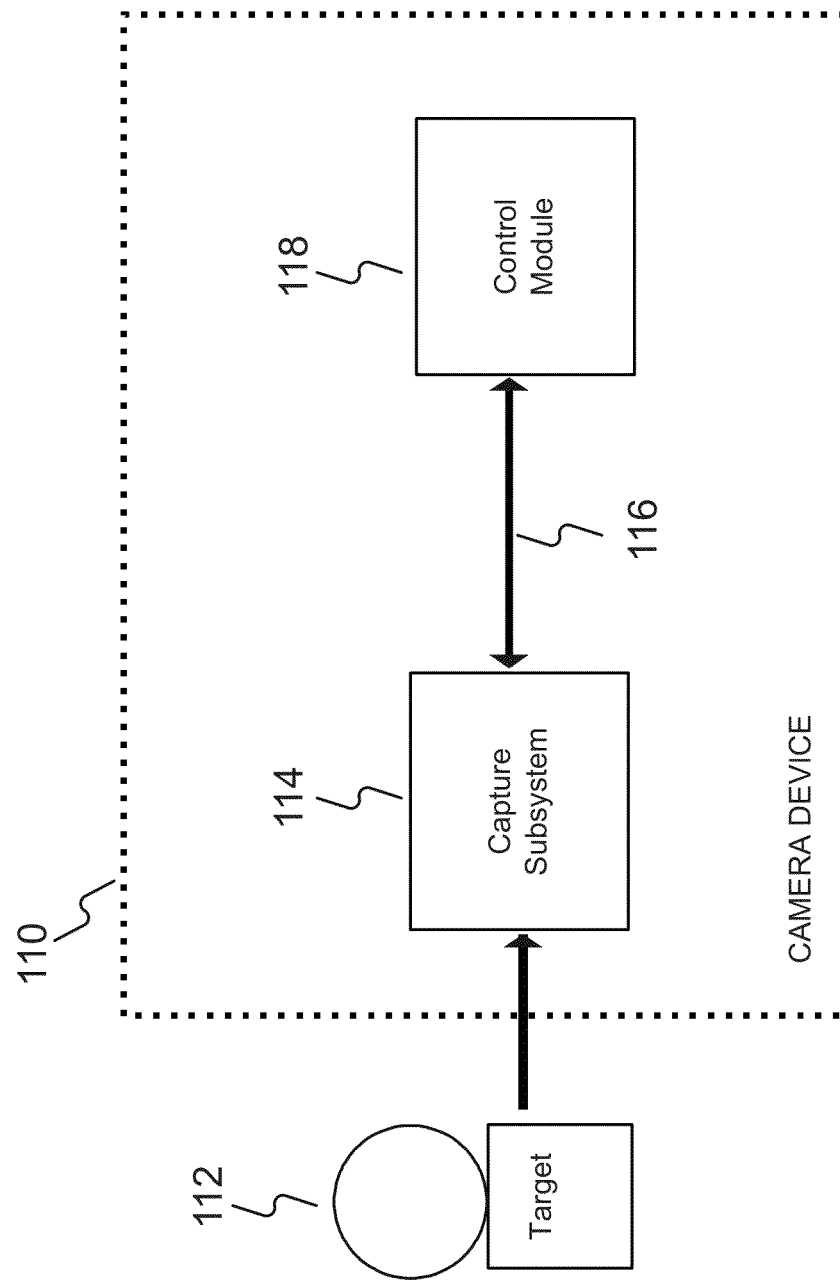
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a photographic target 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may alternately be implemented as an imaging device, a computer device, or a consumer electronics device.

In the FIG. 1 embodiment, once capture subsystem 114 of camera 110 is automatically focused on target 112, a camera user may request camera device 110 to capture image data corresponding to target 112. Control module 118 then may preferably instruct capture subsystem 114 via system bus 116 to capture image data representing target 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
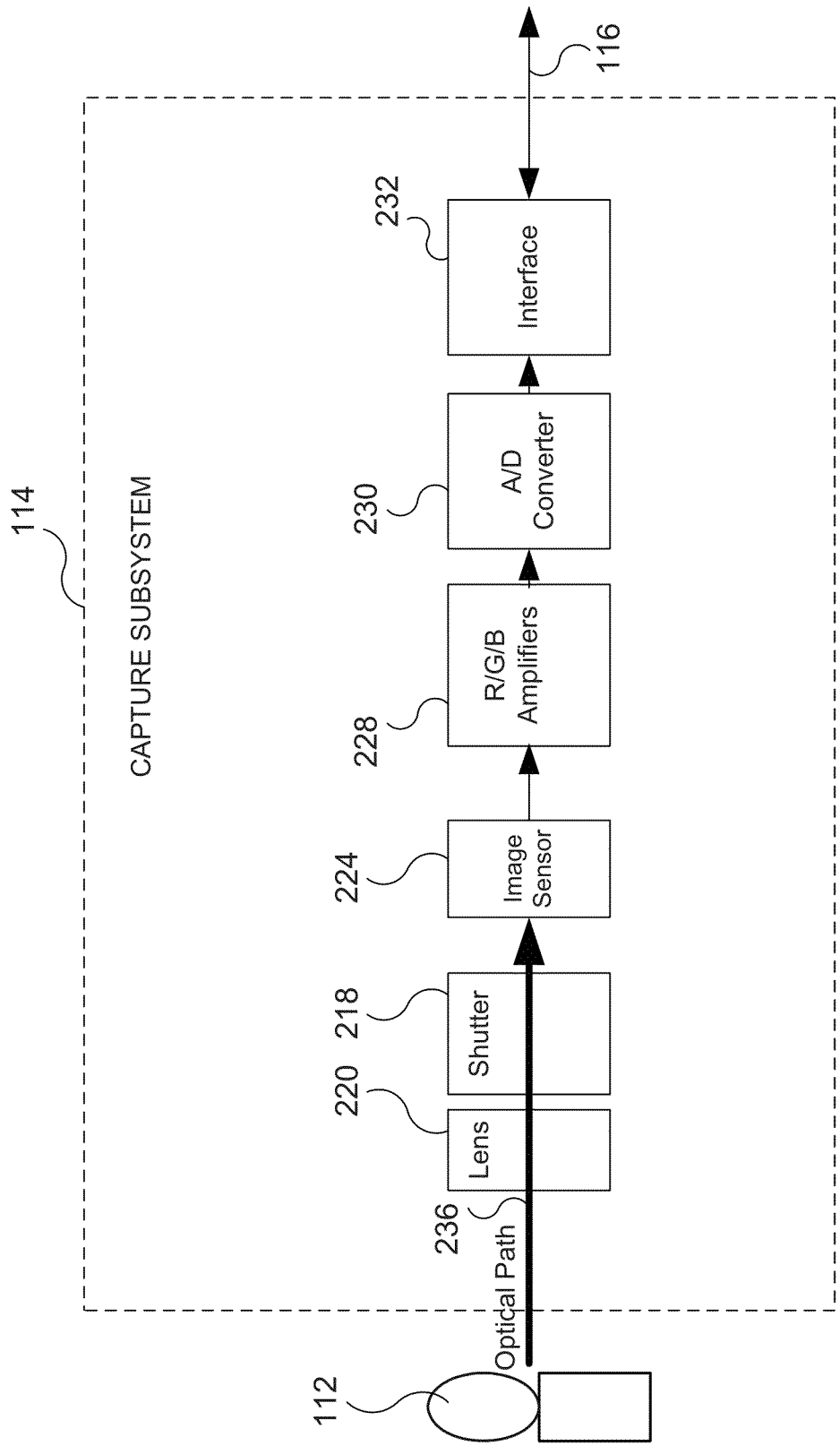
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises, but is not limited to, a shutter 218, a lens 220, an image sensor 224, red, green, and blue (R/G/B) amplifiers 228, an analog-to-digital (A/D) converter 230, and an interface 232. In alternate embodiments, capture subsystem 114 may readily include various other components in addition to, or instead of, those components discussed in conjunction with the FIG. 2 embodiment.

In the FIG. 2 embodiment, capture subsystem 114 may capture image data corresponding to target 112 via reflected light impacting image sensor 224 along optical path 236. Image sensor 224, which may preferably include a charged-coupled device (CCD), may responsively generate a set of image data representing the target 112. The image data may then be routed through amplifiers 228, A/D converter 230, and interface 232. From interface 232, the image data passes over system bus 116 to control module 118 for appropriate processing and storage. Other types of image capture sensors, such as CMOS or linear arrays are also contemplated for capturing image data in conjunction with the present invention. The utilization and functionality of camera 110 is further discussed below in conjunction with FIGS. 3-12B.

Figure 3:
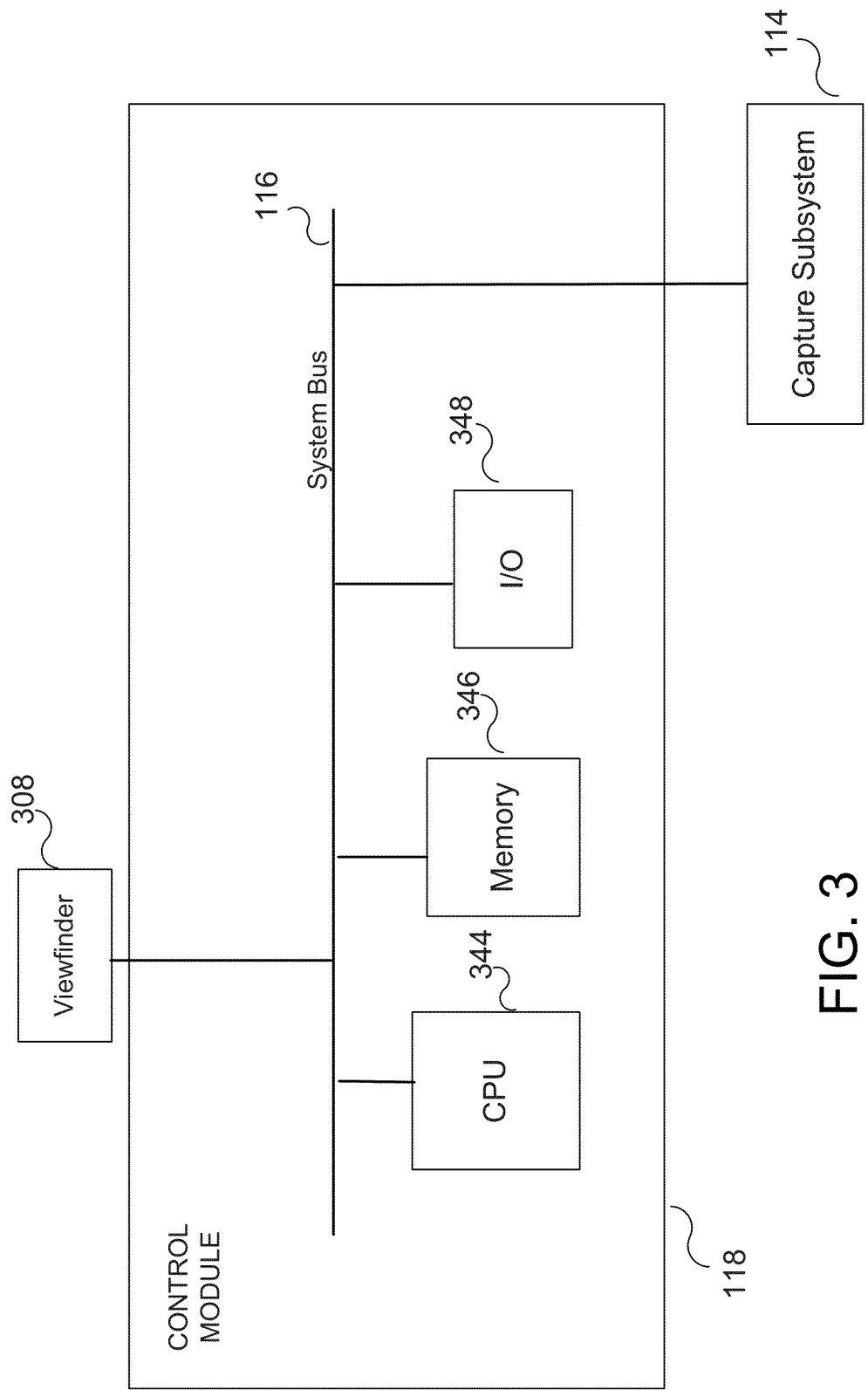
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may be implemented to include any appropriate microprocessor device. Alternately, CPU 344 may be implemented using any other appropriate technology. For example, CPU 344 may be implemented to include certain application-specific integrated circuits (ASICs) or other appropriate electronic devices. Memory 346 may be implemented as one or more appropriate storage devices, including, but not limited to, read-only memory, random-access memory, and various types of non-volatile memory, such as floppy disc devices, hard disc devices, or flash memory. I/O 348 may provide one or more effective interfaces for facilitating bi-directional communications between camera device 110 and any external entity, including a system user or another electronic device. I/O 348 may be implemented using any appropriate input and/or output devices. The operation and utilization of control module 118 are further discussed below in conjunction with FIGS. 4 through 12B.

Figure 4:
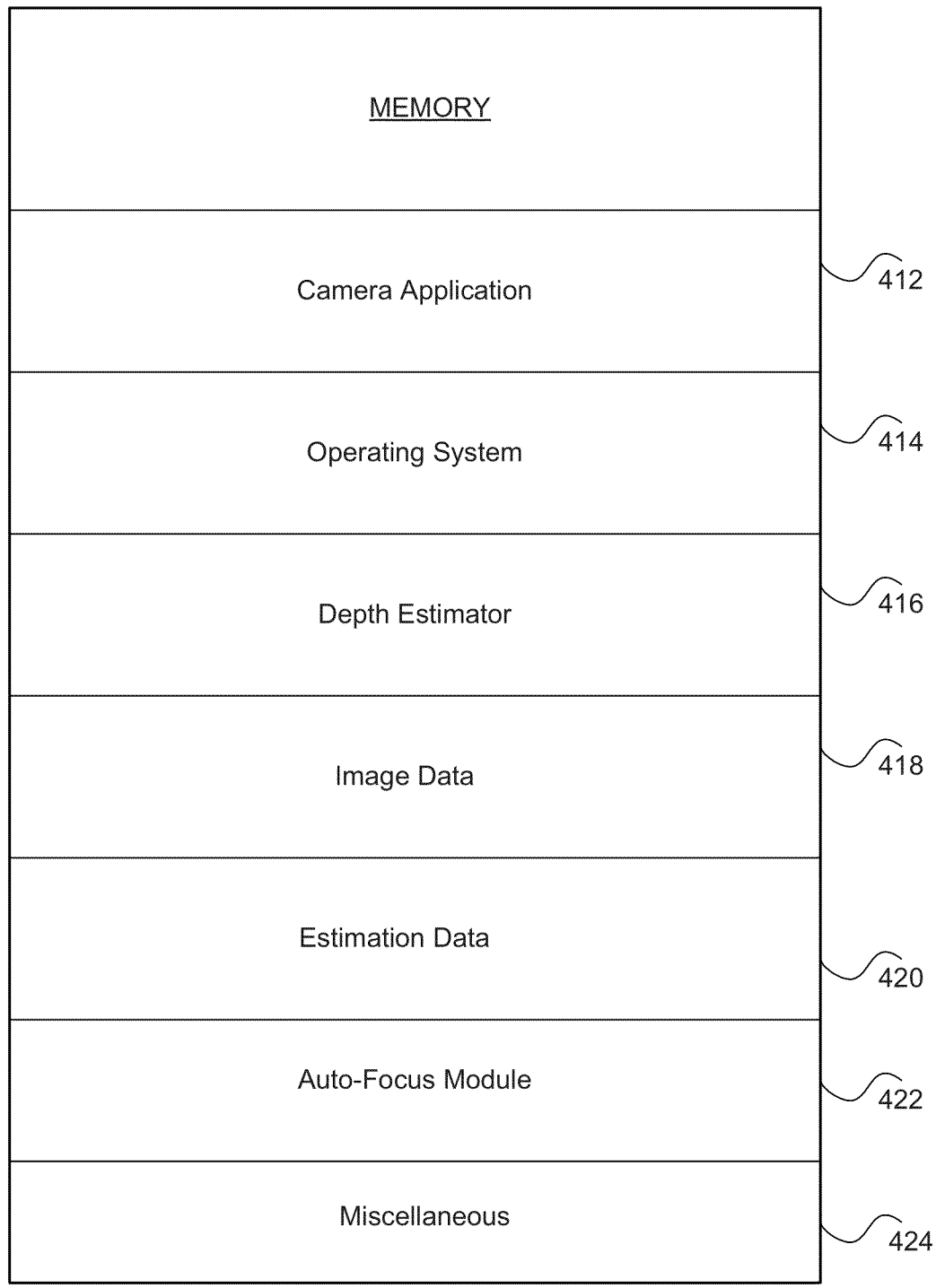
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may include, but is not limited to, a camera application 412, an operating system 414, a depth estimator 416, image data 418, estimation data 420, an auto-focus module 422, and miscellaneous information 424. In alternate embodiments, memory 346 may include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, depth estimator 416 may control and coordinate a depth estimation procedure to facilitate automatic focus features in camera 110. In the FIG. 4 embodiment, image data 418 may include one or more images of a photographic target 112 captured by camera device 110. Estimation data 420 may include any types of information or data for performing a depth estimation procedure. In the FIG. 4 embodiment, auto-focus module 422 may utilize the results of the depth estimation procedure to perform an auto-focus procedure for camera device 110. Miscellaneous information 424 includes any other appropriate information for the operation of camera 110. Additional details regarding the operation of depth estimator 416 are further discussed below in conjunction with FIGS. 5-12B.

Figure 5:
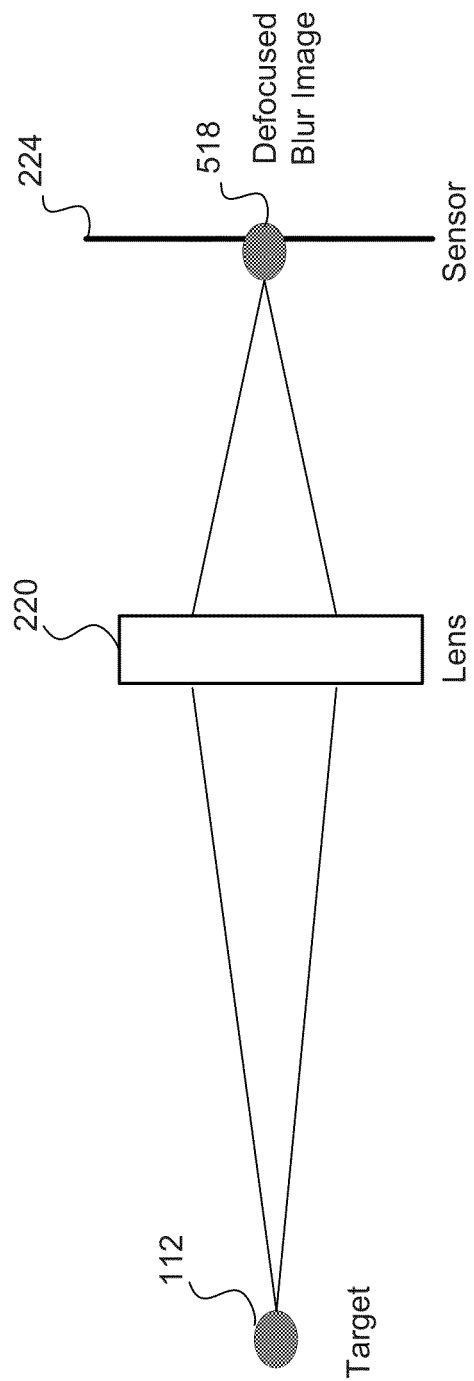
FIG. 5 is a diagram of one exemplary embodiment for capturing a defocused blur image, in accordance with the present invention.

Referring now to FIG. 5, a diagram of one exemplary embodiment for capturing a defocused blur image 518 is shown, in accordance with the present invention. The FIG. 5 embodiment is provided for purposes of illustration, and in alternate embodiments, the present invention may utilize various other configurations and elements to capture defocused blur images 518.

In the FIG. 5 embodiment, a sensor 224 of a camera 110 (see FIG. 2) may capture a defocused blur image 518 of a photographic target or scene 112 for performing a depth estimation procedure. The defocused blur image 518 may be created by adjusting lens 220 to a position other than the correct in-focus lens position that depends upon the relative positions of target 112, lens 220, and sensor 224.

In one embodiment, two different defocused blur images 518 may be compared to derive a depth estimation. A blur difference may be calculated for two blur images 518 that are, for example, one depth-of-field away from each other. A slope of a known matching curve and the blur difference can be utilized to determine the depth of a given target 112. The generation and utilization of defocused blur images for depth estimation are further discussed below in conjunction with FIGS. 6-12B.

Figure 6:
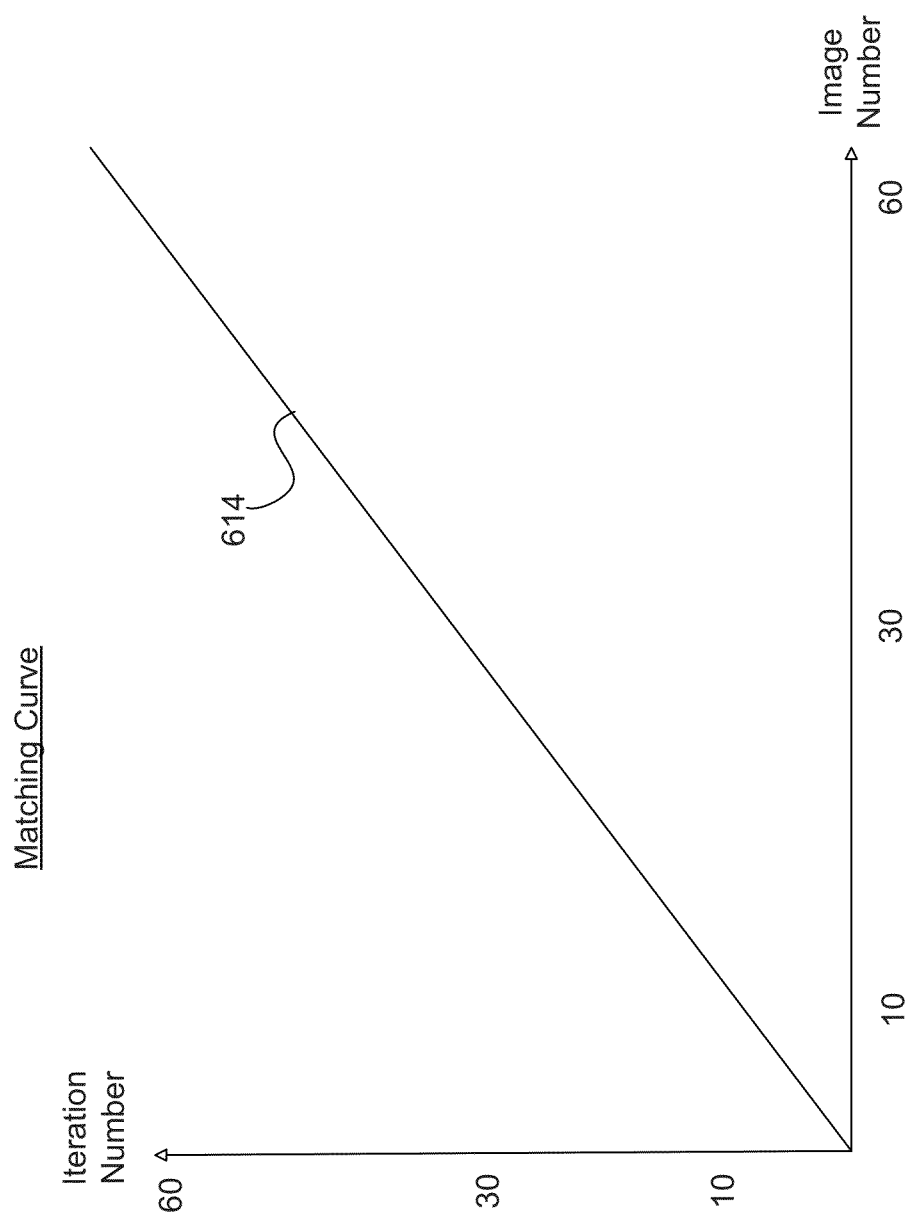
FIG. 6 is a graph of an exemplary matching curve, in accordance with one embodiment of the present invention.

Referring now to FIG. 6, a graph of an exemplary matching curve 714 is shown, in accordance with one embodiment of the present invention. The FIG. 6 embodiment is presented for purposes of illustration, and in alternate embodiments, the present invention may be implemented to utilize matching curves with configurations and parameters in addition to, or instead of, certain of those configurations and parameters discussed in conjunction with the FIG. 6 embodiment.

In certain embodiments, a blur image1 and a more-defocused blur image2 may be captured, the sharper image1 may be convolved with a Gaussian kernel (for example, a 3×3 Gaussian matrix with small variance) to produce a convolved image1. The convolved image1 is compared to blur image2. This process is repeated until the two blur image match. A matching error value may represent the remaining difference between the two images after a predetermined number of kernel convolutions. The number of iterations may then be graphed against depth-of-field (or image numbers in increments of one DOF) to produce a blur matching curve that can be used to estimate the distance from any out-of-focus position to the in-focus position.

In certain embodiments, multiple stages of convolution may be utilized to improve efficiency. For example, a smaller kernel may be utilized to perform the convolution procedure in smaller segments. Additional details regarding the foregoing depth estimation technique are further discussed in U.S. Pat. No. 8,045,046 to Li et al., which is hereby incorporated by reference.

Figure 7:
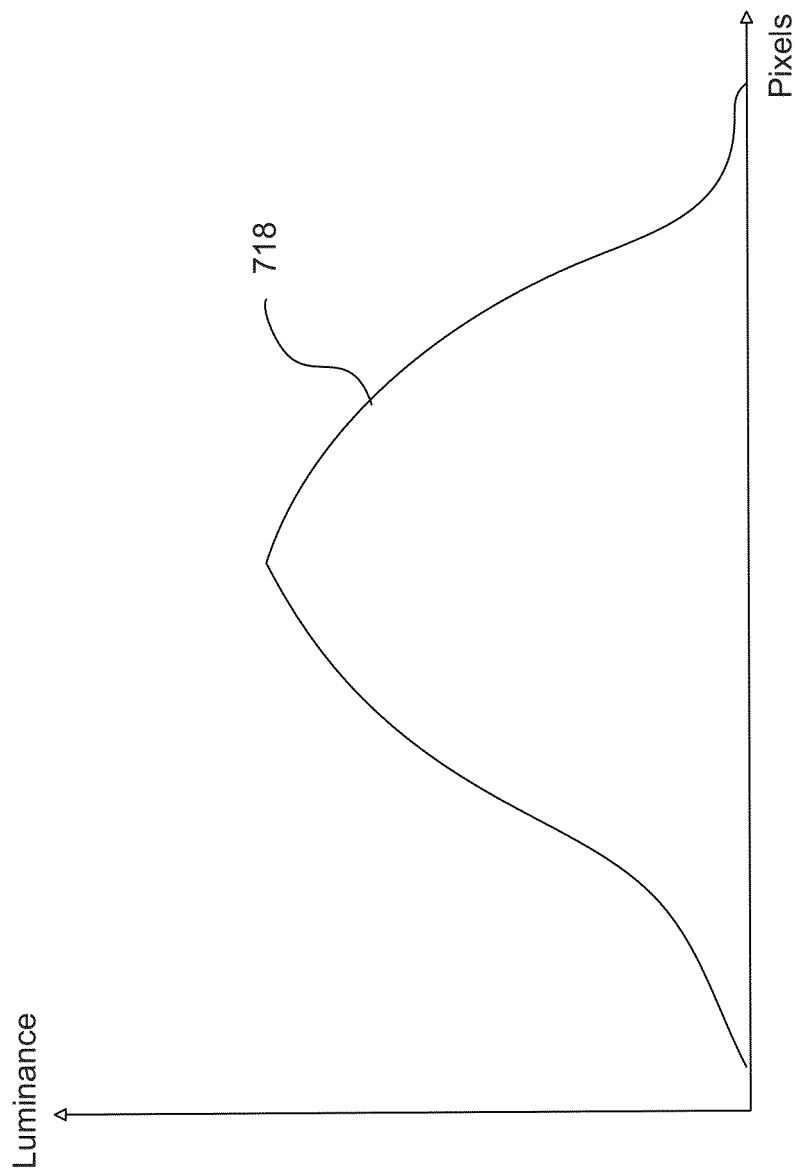
FIG. 7 is a graph of an exemplary Gaussian model of a blur image, in accordance with one embodiment of the present invention.

Referring now to FIG. 7, a graph of an exemplary Gaussian model 718 of a blur image 518 (FIG. 5) is shown, in accordance with one embodiment of the present invention. The FIG. 7 embodiment is presented for purposes of illustration, and in alternate embodiments, the present invention may utilize Gaussian models with elements and configurations other than those discussed in conjunction with the FIG. 7 embodiment.

In the FIG. 7 embodiment, luminance is represented on a vertical axis and pixels are represented on a horizontal axis. In the FIG. 7 graph, Gaussian model 718 displays a typical bell-curve shape. However, not all blur images 518 are best represented by utilizing a Gaussian model 718. Depending upon lighting parameters and other image characteristics of a photographic target or scene, certain non-Gaussian models may be more effective. One example of a non-Gaussian model is further discussed below in conjunction with FIG. 8.

Figure 8:
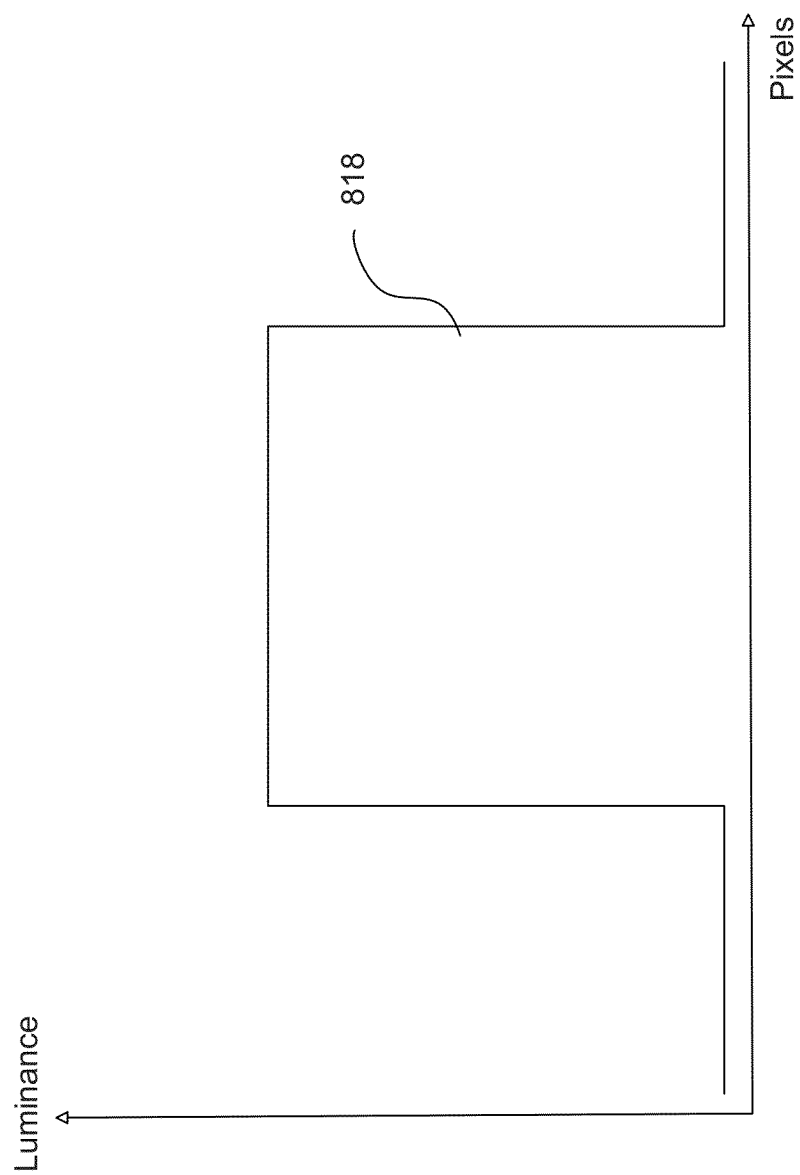
FIG. 8 is a graph of an exemplary pillbox model of a blur image, in accordance with one embodiment of the present invention.

Referring now to FIG. 8, a graph of an exemplary pillbox model of a blur image 518 shown, in accordance with one embodiment of the present invention. The FIG. 8 embodiment is presented for purposes of illustration, and in alternate embodiments, the present invention may utilize pillbox models with elements and configurations other than those discussed in conjunction with the FIG. 8 embodiment.

In the FIG. 8 embodiment, luminance is represented on a vertical axis and pixels are represented on a horizontal axis. In the FIG. 8 graph, pillbox model 818 displays a typical sharp-edged shape. Depending upon lighting parameters and other image characteristics of a photographic target or scene, certain non-Gaussian models, such as pillbox model 818, may be more effective. For example, a pillbox model 818 may be better for a dark night scene that includes a very bright light source such as a candle. Additional details regarding pillbox blurs are further discussed below in conjunction with FIGS. 12A-12B.

Figure 9A:
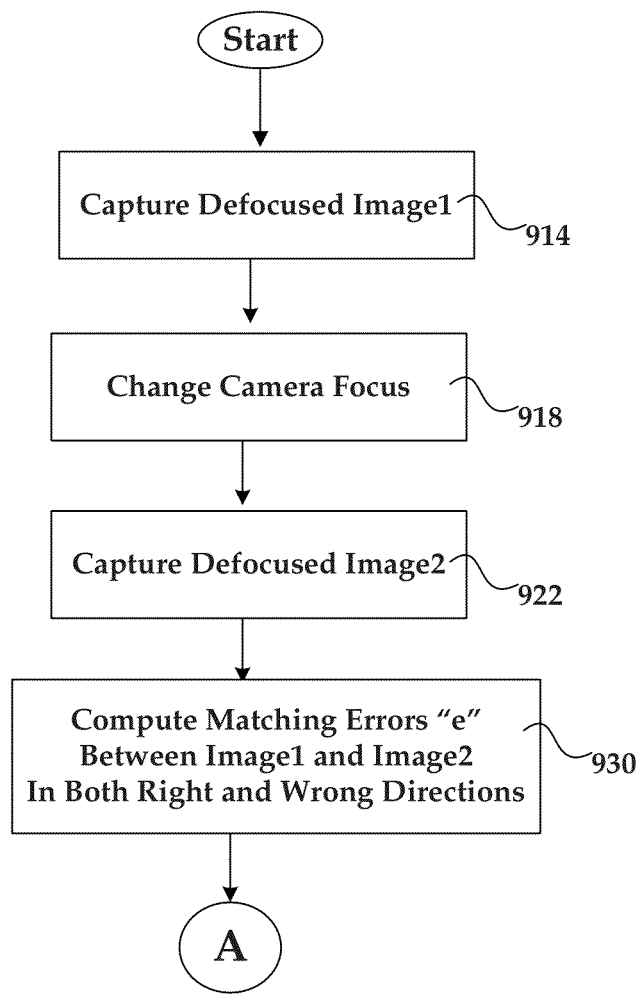
FIGS. 9A-9B are a flowchart of method steps for generating a direction confidence measure, in accordance with one embodiment of the present invention.
Figure 9B:
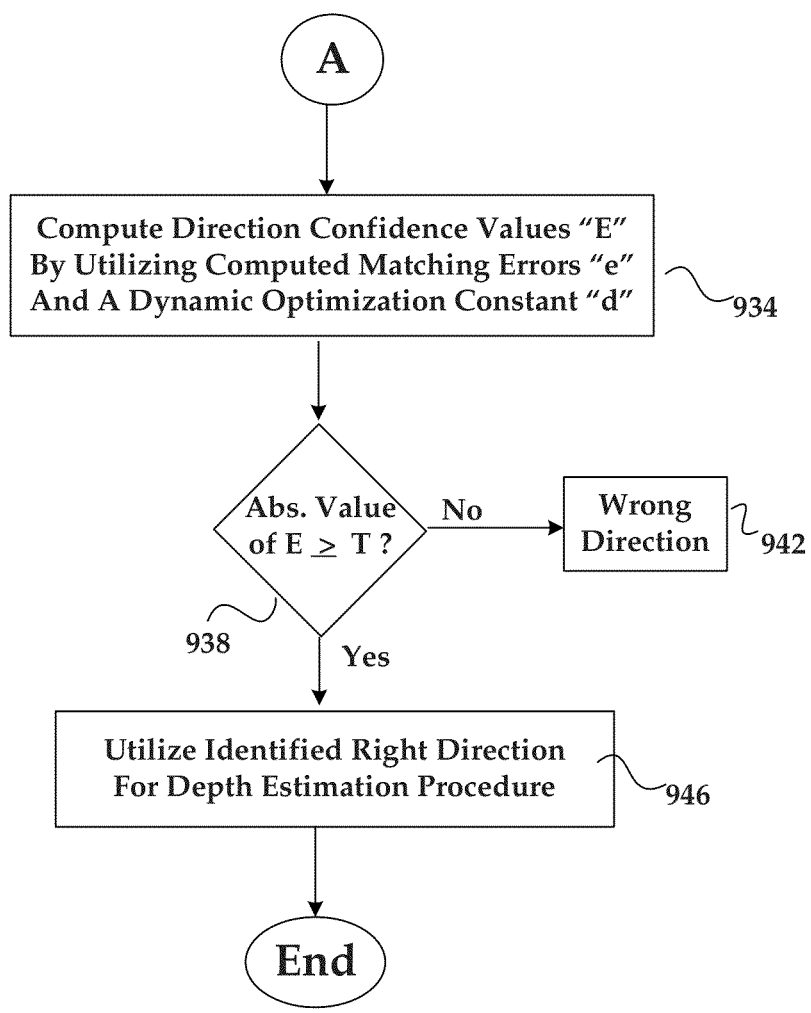

Referring now to FIGS. 9A-9B, a flowchart of method steps for generating a direction confidence measure is shown, in accordance with one embodiment of the present invention. The FIG. 9 embodiment is presented for purposes of illustration, and in alternate embodiments, the present invention may readily utilize various steps and sequences other than those steps and sequences discussed in conjunction with the FIG. 9 embodiment.

Auto focusing techniques provide subject-distance estimations and/or focus control under a wide range of conditions by using depth estimation techniques. A depth-from-defocus approach relies on estimating depth values based upon two or more pictures taken at different focus settings. Depth values may be estimated by computing the relative blur amount between the pictures, as shown in U.S. Pat. No. 7,711,201, U.S. patent application No. And U.S. Patent Application Publication Nos. 2007/0189750A1, 2010/0080482A1, and 2010/0194971A1, each of which is incorporated herein by reference in its entirety.

In the two pictures case, relative blur may be computed by iteratively matching a less blurry picture to a more blurred version of the picture until a match is achieved with some finite matching error still remaining. Since it may not initially be known which of the two pictures is closer to the in-focus position, iterations in both "directions" are generally computed and then a best match criterion is used to choose the "right" direction. Thus, there is a need to generate a confidence measure for the direction of depth estimation iterations based on the two pictures. Additional details regarding a basic procedure for generating direction confidence measures are disclosed in U.S. patent application Ser. No. 13/078,397 by Li et al. entitled "Focus Direction Detection Confidence System And Method," filed on Apr. 1, 2011, which is hereby incorporated by reference.

In the FIG. 9A embodiment, in step 914, camera 110 captures a defocused image1. In step 918, the focus setting of camera 110 is changed. For example, in the FIG. 9A embodiment, the focus setting may be adjusted to alter the focus of camera 110 by one depth-of-field. In step 922, camera 110 captures a defocused image2 that is focused a certain distance (e.g., one depth-of-field) away from previously captured image1. In step 930, following a kernel convolution process (see FIG. 6), a depth estimator 416 or other appropriate entity computes matching errors "e" between image1 and image2 in both the right direction (from more-focused image to less-focused image) and the wrong direction (from less-focused image to more-focused image). The FIG. 9A process then advances to step 934 of FIG. 9B through connecting letter "A."

In step 934, depth estimator 416 computes a direction confidence measure "E" for image1 and image2 by utilizing the matching errors "e" from foregoing step 930, as well as a dynamic optimization constant "d," to thereby generate the confidence measure. In certain embodiments, depth estimator 416 may compute the direction confidence measure according to the following formula.

$$E = \frac{e_1 - e_2}{d(e_1 + e_2) + 1}$$

where E is the direction confidence measure, $e_1$ is the matching error in a first direction, $e_2$ is the matching error in a second direction, and d is the dynamic optimization constant. In accordance with the present invention, the dynamic optimization constant may be selected depending upon various factors such as image characteristics and lighting conditions.

In step 938, depth estimator 416 determines whether an absolute value of the direction confidence measure E is greater or equal to a predetermined confidence threshold. If the absolute value of the direction confidence measure E is not greater or equal to the predetermined confidence threshold, then a no-confidence direction is indicated. However, if the absolute value of the direction confidence measure E is greater or equal to the predetermined confidence threshold, then a right direction is indicated with a sufficiently high confidence, and the depth estimator 416 may utilize the identified right direction for accurately performing a depth estimation procedure. The FIG. 9 process may then terminate. The present invention therefore provides an improved system and method for evaluating focus direction under various lighting conditions.

Figure 10A:
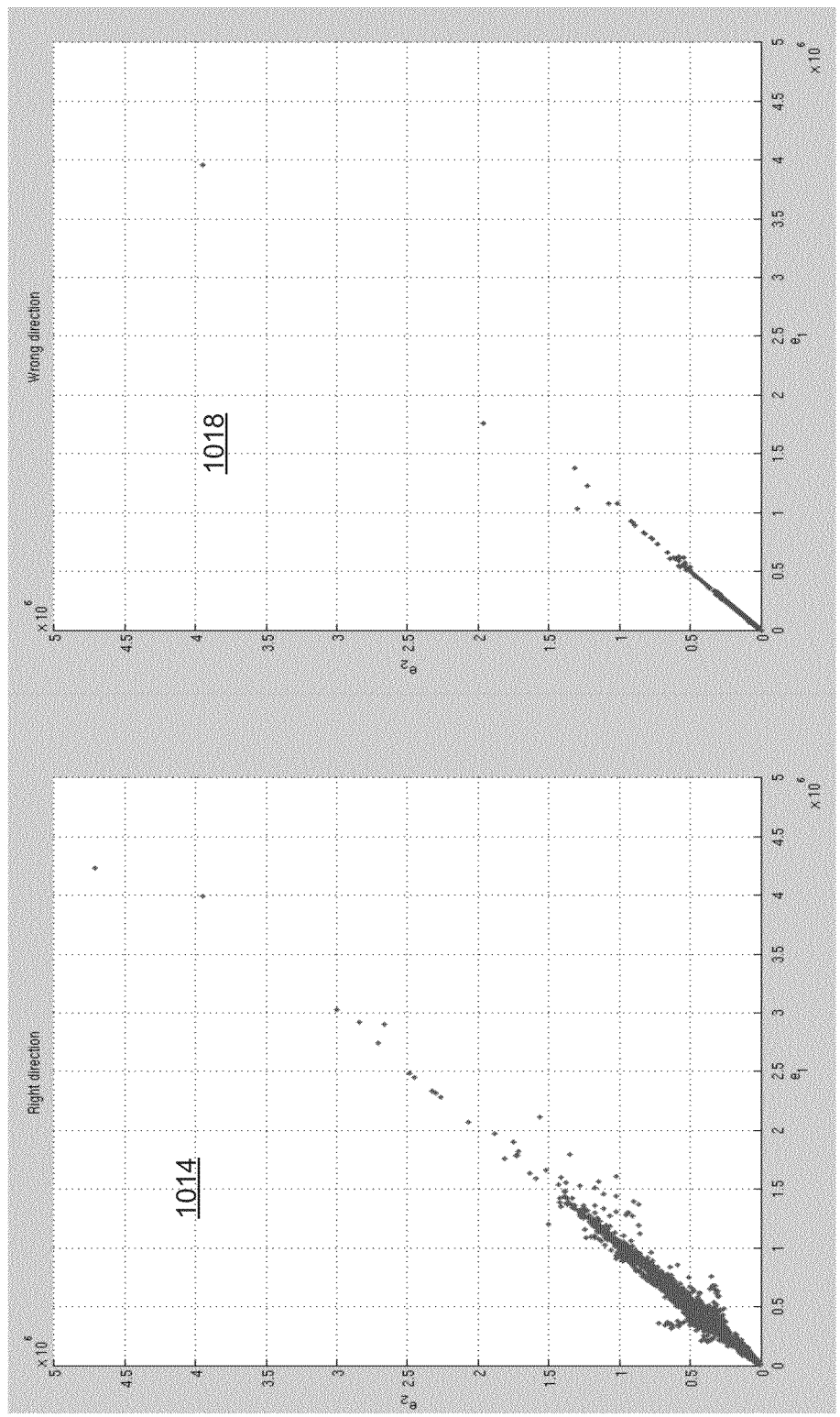
FIGS. 10A-10B are drawings illustrating one embodiment for generating a direction confidence measure.
Figure 10B:

Referring now to FIGS. 10A-10B, drawings illustrating one embodiment for generating a direction confidence measure are shown. The FIG. 10 embodiment is presented for purposes of illustration, and in alternate embodiments, the present invention may generate direction confidence measures using configurations and techniques other than those discussed in conjunction with the FIG. 10 embodiment.

In the FIG. 10A embodiment, graphs showing matching error distributions are shown. The FIG. 10A graphs present the matching error $e_1$ for the first direction on the horizontal axis, and present the matching error $e_2$ for the second direction on the vertical axis. The FIG. 10A graphs represent an analysis of collected data including 55 night scene sequences. There are 14003 matching results in total, of which 90 percent were in the right direction. Of the matching results, 4340 were detected as Gaussian blurs and 9963 were detected as pillbox blurs.

In the FIG. 10A embodiment, the matching errors were calculated for both pillbox blurs and Gaussian blurs. In the FIG. 10A embodiment, the left-side graph 1014 depicts the right direction, and the right-side graph 1018 depicts the wrong direction. It may be noted that the data points for the wrong direction graph 1018 are closely clustered around a 45 degree angle on the graph, while the data points for the right direction graph 1014 are more dispersed with respect to the 45 degree angle of the graph.

In the FIG. 10B embodiment, a confidence performance table 1022 is shown that provides precision values and recall values for the direction confidence measure corresponding to the right direction of the FIG. 10A data. In the FIG. 10A embodiment, a single direction confidence measure E was calculated for both pillbox blurs and Gaussian blurs by utilizing a dynamic optimization constant that was equal to 1.

The FIG. 10B table provides precision values and recall values calculated at several different predetermined confidence thresholds T, as discussed above in conjunction with step 938 of FIG. 9B. In the FIG. 10B embodiment, the precision values are equal to the number of detected right direction/total number of detected matching results. Detected matching results mean results with an indicator value above the threshold T. In the FIG. 10B embodiment, the recall values are equal to the number of detected right direction/the number of all right direction.

In the FIG. 10B confidence performance table 1022, the precision values and recall values represent both Gaussian blurs and pillbox blurs under various lighting conditions with a single direction confidence measure being utilized. This arrangement may produce performance characteristics that are somewhat less than optimal. In accordance with the present invention, certain techniques for addressing this problem are further discussed below in conjunction with FIGS. 11 and 12.

Figure 11A:
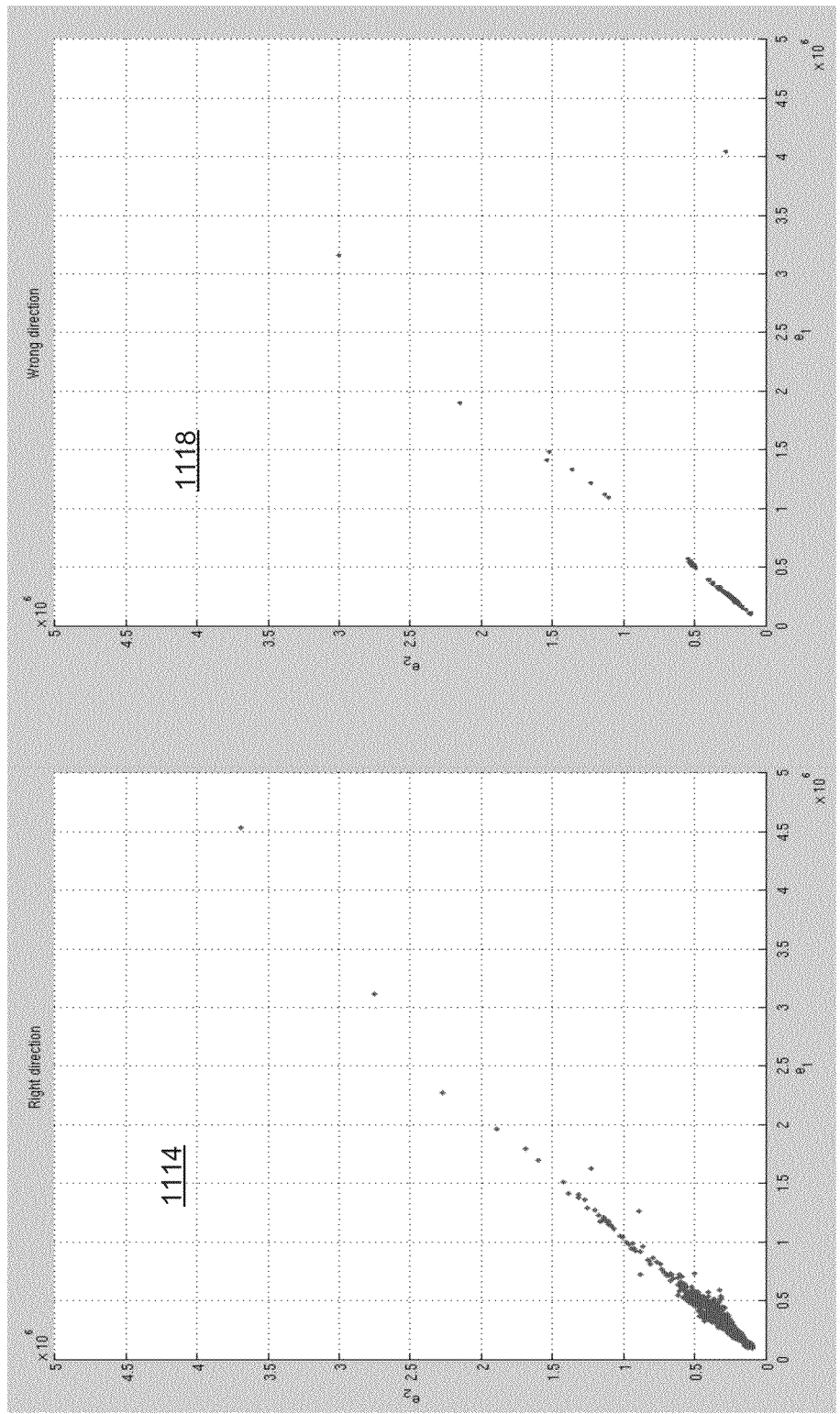

Referring now to FIGS. 11A-11B, drawings illustrating one embodiment for generating a direction confidence measure are shown. The FIG. 11 embodiment is presented for purposes of illustration, and in alternate embodiments, the present invention may generate direction confidence measures using configurations and techniques other than those discussed in conjunction with the FIG. 11 embodiment.

In the FIG. 11A embodiment, graphs showing matching error distributions are shown. The FIG. 11A graphs present the matching error $e_1$ for the first direction on the horizontal axis, and present the matching error $e_2$ for the second direction on the vertical axis. In the FIG. 11A embodiment, the matching errors were calculated only for Gaussian blurs. The matching errors were preferably calculated after the final iteration of the kernel convolution procedures discussed above in conjunction with FIG. 6. In the FIG. 11A embodiment, the left-side graph 1114 depicts the right direction, and the right-side graph 1118 depicts the wrong direction. It may be noted that the data points for the wrong direction graph 1118 are closely clustered around a 45 degree angle on the graph, while the data points for the right direction graph 1114 are more dispersed with respect to the 45 degree angle of the graph.

In the FIG. 11B embodiment, a confidence performance table 1122 is shown that provides precision values and recall values for the direction confidence measure corresponding to the right direction of the FIG. 11A data. In the FIG. 11B embodiment, a single direction confidence measure E was calculated for only Gaussian blurs by utilizing a dynamic optimization constant that was equal to 1.

The FIG. 11B table provides precision values and recall values calculated at several different predetermined confidence thresholds T, as discussed above in conjunction with step 938 of FIG. 9B. In the FIG. 11B embodiment, the precision values are equal to the number of detected right direction/total number of detected matching results. Detected matching results mean results with an indicator value above the threshold T. In the FIG. 11B embodiment, the recall values are equal to the number of detected right direction/the number of all right direction.

In the FIG. 11B confidence performance table 1122, the precision values and recall values represent only Gaussian blurs with a corresponding optimal direction confidence measure being utilized. This arrangement produces confidence-measure performance characteristics for Gaussian blurs with a marked improvement over those performance characteristics in the foregoing table 1022 of FIG. 10B. In accordance with the present invention, details for a related technique for handling pillbox blurs are further discussed below in conjunction with FIG. 12.

Figure 12A:
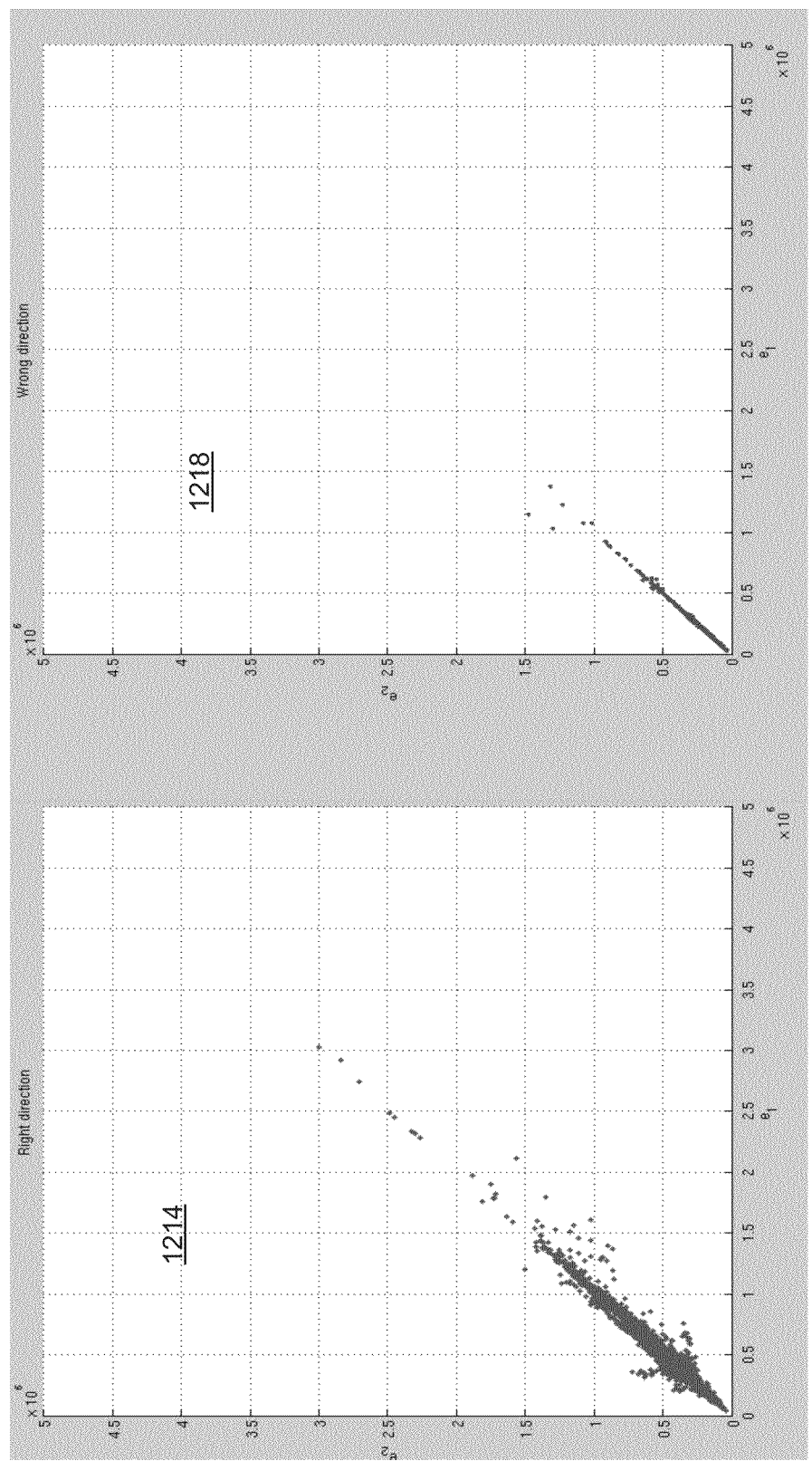

Referring now to FIGS. 12A-12B, drawings illustrating one embodiment for generating a direction confidence measure are shown, in accordance with the present invention. The FIG. 12 embodiment is presented for purposes of illustration, and in alternate embodiments, the present invention may generate direction confidence measures using configurations and techniques other than those discussed in conjunction with the FIG. 12 embodiment.

In the FIG. 12A embodiment, graphs showing matching error distributions are shown. The FIG. 12A graphs present the matching error $e_1$ for the first direction on the horizontal axis, and present the matching error $e_2$ for the second direction on the vertical axis. In the FIG. 12A embodiment, the matching errors were calculated only for pillbox blurs. In accordance with the present invention, the matching errors were preferably calculated immediately before a second stage of Gaussianization as disclosed in U.S. patent application Ser. No. 13/426,828 by Li et al. entitled "System And Method For Performing Depth Estimation Utilizing Pillbox Defocused Images," filed on Mar. 22, 2012, which is hereby incorporated by reference. In the FIG. 12A embodiment, the left-side graph 1214 depicts the right direction, and the right-side graph 1218 depicts the wrong direction. It may be noted that the data points for the wrong direction graph 1218 are closely clustered around a 45 degree angle on the graph, while the data points for the right direction graph 1214 are more dispersed with respect to the 45 degree angle of the graph.

In the FIG. 12B embodiment, confidence performance tables 1222(*a*) and 1222(*b*) are shown that provide precision values and recall values for the direction confidence measure corresponding to the right direction of the FIG. 12A data. In confidence performance table 1222(*a*), a single direction confidence measure E was calculated for only pillbox blurs by utilizing a dynamic optimization constant that was equal to 1. In confidence performance table 1222(*b*), a single direction confidence measure E was calculated for only pillbox blurs by utilizing a dynamic optimization constant that was equal to 0.

The FIG. 12B table provides precision values and recall values calculated at several different predetermined confidence thresholds T, as discussed above in conjunction with step 938 of FIG. 9B. In the FIG. 12B embodiment, the precision values are equal to the number of detected right direction/total number of detected matching results. Detected matching results mean results with an indicator value above the threshold T. In the FIG. 12B embodiment, the recall values are equal to the number of detected right direction/the number of all right direction.

In the FIG. 12B confidence performance tables 1222(*a*) and 1222(*b*), the precision values and recall values represent only pillbox blurs with a corresponding direction confidence measure being utilized. It will be noted that confidence performance tables 1222(*b*) provide significantly improved recall values. Therefore, an optimal dynamic optimization constant of zero may be selected for calculating optimized direction confidence measures for pillbox blurs.

In accordance with the present invention, these confidence performance tables may be advantageously utilized to evaluate and select optimal dynamic optimization constants and confidence thresholds for evaluating direction confidence measures, depending upon various factors such as the image characteristics, lighting conditions, and camera type. For all of the foregoing reasons, present invention therefore provides an improved system and method for evaluating focus direction under various lighting conditions.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for generating a direction confidence measure, comprising:
   a sensor device that captures blur images of a photographic target; and
   a depth estimator that calculates matching errors for said blur images, said depth estimator then generating said direction confidence measure by utilizing said matching errors and a dynamic optimization constant that is selected depending upon image characteristics of said blur images, said blur images including a first blur image and a second blur image, said first blur image being set at a different focus setting than said second blur image, said depth estimator performing a depth estimation procedure by performing iterations of a kernel convolution process in a focus direction that proceeds from said first blur image towards said second blur image.

2. The system of claim 1 wherein said sensor device and said depth estimator are implemented in an electronic camera device.

3. The system of claim 1 wherein said electronic camera device utilizes said direction confidence measure for generating depth estimations to perform an automatic focusing procedure.

4. The system of claim 1 wherein said image characteristics include an image type of said blur images.

5. The system of claim 4 wherein said image type includes a Gaussian blur image and a pillbox blur image.

6. The system of claim 1 wherein said image characteristics include lighting conditions for said blur images.

7. The system of claim 1 wherein said blur images include a first blur image and a second blur image, said first blur image being set at a different focus setting than said second blur image.

8. A system for generating a direction confidence measure, comprising:
   a sensor device that captures blur images of a photographic target; and
   a depth estimator that calculates matching errors for said blur images, said depth estimator then generating said direction confidence measure by utilizing said matching errors and a dynamic optimization constant that is selected depending upon image characteristics of said blur images, said blur images include a first blur image and a second blur image, said first blur image being set at a different focus setting than said second blur image, said depth estimator performing a depth estimation procedure by performing iterations of a kernel convolution process in a right direction upon said first blur image towards said second blur image, a wrong direction describing a reverse process of performing iterations of said kernel convolution process from said second blur image towards said first blur image.

9. The system of claim 8 wherein said matching errors include a right-direction matching error and a wrong-direction matching error, said right-direction matching error corresponding to said right direction, said wrong-direction matching error corresponding to said wrong direction.

10. The system of claim 9 wherein said sensor device captures an image1 corresponding to a photographic target by utilizing a first defocused lens position, said camera device then being adjusted to a second defocused lens position that is different than said first defocused lens position, said sensor device capturing an image2 corresponding to said photographic target by utilizing said second defocused lens position, said second defocused lens position having a different focus setting than said first defocused lens position.

11. The system of claim 10 wherein said depth estimator computes said matching errors between said image1 and said image2 in both said right direction and said wrong direction, said depth estimator then computing said direction confidence measure for said image1 and said image2 by utilizing said matching errors and said dynamic optimization constant to thereby generate the confidence measure.

12. The system of claim 11 wherein said depth estimator computes said direction confidence measure according to a formula:

$$E = \frac{e_1 - e_2}{d(e_1 + e_2) + 1}$$

where E is said direction confidence measure, $e_1$ is one of said matching errors in a first direction, $e_2$ is another of said matching errors in a second direction, and d is said dynamic optimization constant.

13. The system of claim 11 wherein said matching errors for Gaussian blur images are calculated after a final iteration of a kernel convolution procedure, said matching errors for pillbox blur images being calculated immediately before a second iteration of a Gaussianization procedure.

14. The system of claim 11 wherein said depth estimator determines whether an absolute value of said direction confidence measure is greater or equal to a predetermined confidence threshold to thereby indicate that said right direction has been identified with sufficiently high confidence.

15. The system of claim 11 wherein said dynamic optimization constant is selected to be a first optimal value when said blur images are Gaussian blur images, said dynamic optimization constant being selected to be a second optimal value when said blur images are pillbox blur images.

16. The system of claim 15 wherein said first optimal value and said second optimal value are selected based upon a statistical analysis of said matching errors from an extensive body of exemplary blur image data.

17. The system of claim 15 wherein said first optimal value and said second optimal value are selected based upon a confidence performance table that includes one or more of said confidence threshold with corresponding precision values and recall values for said direction confidence measure.

18. The system of claim 17 wherein said precision values are equal to a number of detected right directions divided by a total number of detected matching results.

19. The system of claim 17 wherein said recall values are equal to a number of detected right directions divided by a total number of all right directions.

20. A method for generating a direction confidence measure by performing the steps of:
providing a sensor device that captures blur images of a photographic target; and
utilizing a depth estimator to calculate matching errors for said blur images, said depth estimator then generating said direction confidence measure by utilizing said matching errors and a dynamic optimization constant that is selected depending upon image characteristics of said blur images, said blur images including a first blur image and a second blur image, said first blur image being set at a different focus setting than said second blur image, said depth estimator performing a depth estimation procedure by performing iterations of a kernel convolution process in a focus direction that proceeds from said first blur image towards said second blur image.

* * * * *